US008249583B2

(12) United States Patent
Cancer Abreu et al.

(10) Patent No.: US 8,249,583 B2
(45) Date of Patent: Aug. 21, 2012

(54) METHOD AND SYSTEM FOR IDENTIFYING AND CHARACTERISING THE IMPACT OF NETWORK INCIDENTS ON THE TELECOMMUNICATION SERVICES OFFERED TO USERS

(75) Inventors: Andrés Cancer Abreu, Madrid (ES); Carlos Gascon Navarro, Madrid (ES)

(73) Assignee: TELEFONICA, S.A., Madrid (ES)

( * ) Notice: Subject to any disclaimer, the term of this patent is extended or adjusted under 35 U.S.C. 154(b) by 0 days.

(21) Appl. No.: 13/139,566

(22) PCT Filed: Dec. 11, 2009

(86) PCT No.: PCT/ES2009/070577
§ 371 (c)(1),
(2), (4) Date: Sep. 8, 2011

(87) PCT Pub. No.: WO2010/070172
PCT Pub. Date: Jun. 24, 2010

(65) Prior Publication Data
US 2012/0058757 A1 Mar. 8, 2012

(30) Foreign Application Priority Data
Dec. 15, 2008 (ES) .................................. 200803548

(51) Int. Cl.
*H04W 24/00* (2009.01)
(52) U.S. Cl. ........... 455/423; 709/224; 709/226; 379/35
(58) Field of Classification Search .................. 455/423, 455/424, 428, 67.11
See application file for complete search history.

(56) References Cited

U.S. PATENT DOCUMENTS

| 7,353,265 | B2 * | 4/2008 | Gopalkrishnan et al. ...... 709/223 |
| 7,733,767 | B2 * | 6/2010 | Granath ........................ 370/216 |

FOREIGN PATENT DOCUMENTS

| EP | 1 465 446 | 10/2004 |
| ES | 2 243 869 | 12/2005 |
| WO | 2005/117560 | 12/2005 |
| WO | 2006/057588 | 6/2006 |

OTHER PUBLICATIONS

International Search Report dated Mar. 30, 2010 from corresponding International Application No. PCT/ES2009/070577.
Enhanced Telecom Operations Map (eTom) The Business Process Framework for the Information and Communications Services Industry, Addendum F: Process Flow Examples (GB921 F Version 4.0) Feb. 2004.
Wireless Services Measurements Handbook (GB923 Approved Version 3.0) Mar. 2004.

(Continued)

*Primary Examiner* — Kamran Afshar
*Assistant Examiner* — Joseph Dean, Jr.
(74) *Attorney, Agent, or Firm* — Katten Muchin Rosenman LLP

(57) ABSTRACT

The present Invention relates to a method and to a system for identifying and characterizing the impact of network incidents on the telecommunication services offered to users. According to the invention, the system for identifying and characterizing an incident in a service offered to a user of a telecommunications network comprises an unavailability selection module (1), a consolidation module (4), an aggregation module (10), a stabilization module (12) and a notification module (14).

6 Claims, 5 Drawing Sheets

OTHER PUBLICATIONS

ITU International Telecommunication Union, CCITT The International Telegraph and Telephone Consultative Committee, Data Communications Networks: Information Technology-Open Systems Interconnection-Systems Management: Alarm Reporting Function, Recommendation X.733, Geneva, 1992.

3GPP TS 32.111-4 V4.6.0. 3rd Generation Partnership Project; Technical Specification Group Services and System Aspects; Telecommunication Management; Fault Management (FM); Part 4: Alarm Integration Reference Point (IRP): Common Management Information Protocol (CMIP) Solution Set (SS) Release 4, Sep. 2003.

Dave Raymer, et al. "Fault Management API Overview 1.0", OSS through Java Initiative, Sep. 14, 2007.

Dave Raymer, et al. "Fault Management API User's Guide 1.0", OSS through Java Initiative, Sep. 14, 2007.

Marc Flauw, et al. "Fault Management API v 1.0" OSS through Java Initiative, Sep. 14, 2007.

Stefan Aberg. "OSS Quality of Service API Version 0.9 Overview (Part 1)" OSS through Java Initiative, Sep. 14, 2007.

Stefan Aberg. "OSS Quality of Service API Version 0.9.1 User Guide (Part 2)" OSS through Java Initiative, Sep. 14, 2007.

Stefan Aberg. "OSS Quality of Service API Version 0.9.1 Java Reference (Part 3)" OSS through Java Initiative, Sep. 14, 2007.

\* cited by examiner

METHOD AND SYSTEM FOR IDENTIFYING AND CHARACTERISING THE IMPACT OF NETWORK INCIDENTS ON THE TELECOMMUNICATION SERVICES OFFERED TO USERS

FIELD OF THE INVENTION

The present invention is applicable in the field of telecommunications, and more specifically in the area of assuring the quality of service of the process map of a telecommunication services operator.

BACKGROUND OF THE INVENTION

Important advances have been made up until now in the identification, characterization and standardization of the faults and incidents which refer to the resources of a telecommunication network, as well as to the treatment thereof.

The following should be emphasized in this field:

The "X.733 Alarm Reporting Function" recommendation of the International Telecommunication Union (ITU-T, International Telecommunication Unit-Telecommunication Sector).

The "TS 32.111-x Alarm Integration Reference Point" recommendations of the Partnership Project for the 3rd Generation of Mobile Systems (3GPP, 3rd Generation Partnership Project).

The application programming interfaces (APIs) "ISR-000090 Quality-of-Service API" and "JSR-000263 Fault Management API" of the OSS through Java (OSS/J) initiative.

The Multi-Technology Operation System Interface (MTOSI).

Patent document WO 2006/057588 discloses a method for correlating alarms generated by different network elements (NEs) which functionally depend on one another, by means of the incorporation in the alarms of a Fault Identifier (FID, Fault ID) generated by the network element which discovers the fault. The network elements functionally depend on one another such that if one of them (serving NE) fails, then another network element (client NE) will also stop providing, at least partly, the services that it offers. The serving NE generates the Fault Identifier (FID) and incorporates it both in the traffic message which it sends to the client NE and in the alarm that it sends to the network management system. The client NE extracts the RD from the traffic message and includes it in its own service alarm which it sends to the management system. In the management system, the FID is used to correlate the two alarms with one another (the one sent by the serving NE and the one sent by the client NE). The invention described in this patent application is exclusively applied to the network element management and is only objective is to allow correlating or pairing alarms which can be informed to the user from various elements.

Patent document WO2005/117560 describes a method and a system for monitoring and managing applications and services. The method uses a repository storing information of the resources and of the relationships between the resources. The resources which serve as support to an application and the applications which are included in each service are identified in the repository. The method is based on collecting and aggregating events and performance information of the identified resources, of the applications and/or of the services. This aggregated information is displayed to the users by means of a portal.

Finally, patent ES-2243869-T3 describes a system which allows the automated generation of service interruption reports in a mobile communications network from the data of service loss experienced by the mobile terminals themselves. The data of service loss of the mobile terminals include data identifying the geographical area in which the service loss has been experienced.

In conclusion, there is an important need in relation to the transformation and aggregation of individual events and failures of network resources in incidents with impact on the service which combine all of them, as well as the characterization (identification, extent, etc.) and transformation over time of said incidents.

The recommendations issued by the standardization organizations are centered on the exchange of information of network incidents but do not provide information about how to characterize the impact thereof on the telecommunication services offered to the user.

On the other hand, the first two patent documents mentioned above attempt to evaluate the impact of the network incidents exclusively in the field of the network itself without evaluating the potential impact on the telecommunication services offered to the user.

Finally, although patent ES-2243869-T3 attempts to characterize the impact on the telecommunication services offered to the user, it does not use the information provided by the network itself, the network incidents, but rather it exclusively uses the information from user complaints to identify affected geographical areas, i.e., it does not establish the connection between the user complaints with network resources.

DESCRIPTION OF THE INVENTION

The invention relates to a method and to a system for identifying and characterizing a network incident on a service offered to a user of said telecommunications network according to claims 1 and 6, respectively. Preferred embodiments of the method and of the system are defined in the dependent claims.

An incident is understood as any event or situation occurring in the normal operation of a telecommunication network and causing a reduction of the capacity thereof to offer services.

The present invention provides a method and a system for identifying and characterizing the impact on the telecommunication services offered to the user from the network incidents, therefore offering a complete approach to the problem, not a partial one as performed by the described background documents.

Thus, a first aspect of the invention relates to a method for identifying and characterizing an incident in a telecommunication network on one or more of the services offered to the users. The method of the invention comprises:

collecting information relative to incidents of said network and of network element managers;

identifying in said information an event relative to the complete unavailability of a network resource, either as a start status or end status of said complete unavailability of a network resource;

notifying each identified event as a potential service incident PSI together with said start status or end status of the resource;

comparing the status of the network resource of each potential service incident PSI with the status previously registered for said resource, which is determined by the previous potential service incidents with reference to that network resource in question, and updating this status if it has changed;

if it has changed, accessing network resource configuration information and service configuration information stored in a network resource inventory and in a service inventory, respectively, and performing a splitting of each potential service incident PSI into as many specific potential service incidents SPSI as services in which said network resource is involved;

determining, individually for each service, if each specific potential service incident SPSI gives rise to a service incident SI or an incident mutation IM, applying correlation techniques which take into account the network topology and, in its absence, criteria of time-space proximity;

identifying each of those incident mutations IM by means of a global fault identifier GFI identifying the service incident to which it belongs and a specific fault identifier SPI identifying the stage of evolution of the incident, said incident mutation including information about the type of incident, an identifier of the service which it affects, a list of affected network resources and the date and time in which the mutation has occurred;

making those incident mutations modifying the list of resources affected by the incident progress, determining the set of users affected by said incident; and notifying the incident mutations to client processes based on subscriptions established by such clients.

The step of determining if each Specific Potential Service Incident SPSI gives rise to a service incident SI or to an incident mutation IM is preferably performed as follows:

if the network resource referenced by the SPSI is related, by functional dependence or by time/space proximity, to network resources encompassed in a single ongoing service incident, then the resource referenced by the SPSI and all those which functionally depend on it are aggregated to the list of resources affected by said service incident;

if the network resource referenced by the SPSI is related, by functional dependence or by time/space proximity, to network resources encompassed in two or more ongoing service incidents, then said Incidents are united in a single one and the resource referenced by the SPSI and all those which functionally depend on it are aggregated to the list of resources affected by the resulting service incident, which retains the characteristics of the oldest service incident of all those aggregated;

if the network resource referenced by the SPSI is not related, by functional dependence or by time/space proximity, to any other network resource encompassed in an ongoing service incident, then a new service incident is created which initially has, as the list of affected resources, the resource referenced by the SPSI and all those which functionally depend on it.

The space proximity relationship between network resources is defined according to the typology of the network resources and the physical location thereof.

A change in the service incident, such as an appearance of new service incidents, is preferably notified as an incident mutation.

Thus, and according to the method of the present invention, status information of the network captured in real time is aggregated and disaggregated for the purpose of providing a single and complete vision, in all its aspects, of an incident in the network throughout its entire life cycle, from its start to its end; characterizing each stage of its evolution by its typology (for example, what may initially be diagnosed as a crash of a base station can subsequently be transformed as a result of the new information of the network received into a crash of a BSC or of a MSC, or into a crash of a transmission node) and by its extent, i.e., by the list of affected network resources in that stage of evolution of the incident.

Furthermore, this integrated vision of an incident in the network and of its evolution throughout its life cycle is offered service by service, i.e., in a broken down manner for each of the telecommunication services which are affected by the incident (for example, GSM voice service, GPRS data service, UMTS voice service, UMTS data service, fixed voice service, ADSL service, etc). The effect on each service throughout the life cycle of the incident can undergo a different evolution according to, for example, the corrective actions which are carried out to solve the incident. It is therefore important to know how each service (and therefore the users thereof) is affected in each of the stages of evolution of the network incident.

A second aspect of the invention relates to a system for identifying and characterizing an incident in a service offered to a user of a telecommunications network, comprising an unavailability selection module, a consolidation module, an aggregation module, a stabilization module and a notification module, wherein:

the unavailability selection module is configured to:
collect from said network and from network element managers information relative to an incident of said network,
identify an event relative to the complete unavailability of a network resource, either as a start status or end status of said complete unavailability of a network resource, and
notifying each identified event to the consolidation module as a potential incident in a service together with said start status or end status of the resource;

the consolidation module is configured to:
compare the status of the network resource of each potential service incident PSI with the status previously registered for said resource, which is determined by the previous potential service incidents with reference to that network resource in question, and update this status if it has changed;
if it has changed, access network resource configuration information and service configuration information stored in a network resource inventory and in a service inventory, respectively, and perform a splitting of each potential service incident into as many specific potential service incidents as services in which said network resource is involved, and
send said specific potential service incidents to the aggregation module;

the aggregation module is configured to:
determine, individually for each service, if each specific potential service incident gives rise to a service incident SI or an incident mutation IM, applying correlation techniques which take into account the network topology and, in its absence, criteria of time-space proximity;
identify each of said incident mutations by means of a global fault identifier GFI and a specific fault identifier SFI, and send it to the stabilization module, said incident mutation IM including information relative to the type of the incident, an identifier of the service which it affects, a list of affected network resources and the date and time in which the mutation has occurred;

the stabilization module is configured to make incident mutations modifying the extent or the type of the service incident to which they belong progress to the notification module; and the notification module is configured to notify the incident mutations to client processes based on the subscriptions established by such clients.

Up until now there is no knowledge of the existence of any method or system which provides this evolutive and complete vision of an incident in the network, from its start to its end, discriminating the degree in which each of the telecommunication services is affected in each of the stages of evolution of the incident.

BRIEF DESCRIPTION OF THE DRAWINGS

To complement the description which is being made and for the purpose of aiding to better understand the features of the invention, an embodiment of the invention is briefly described below as an illustrative and non-limiting example thereof.

DESCRIPTION OF A PREFERRED EMBODIMENT OF THE INVENTION

Figure 1:
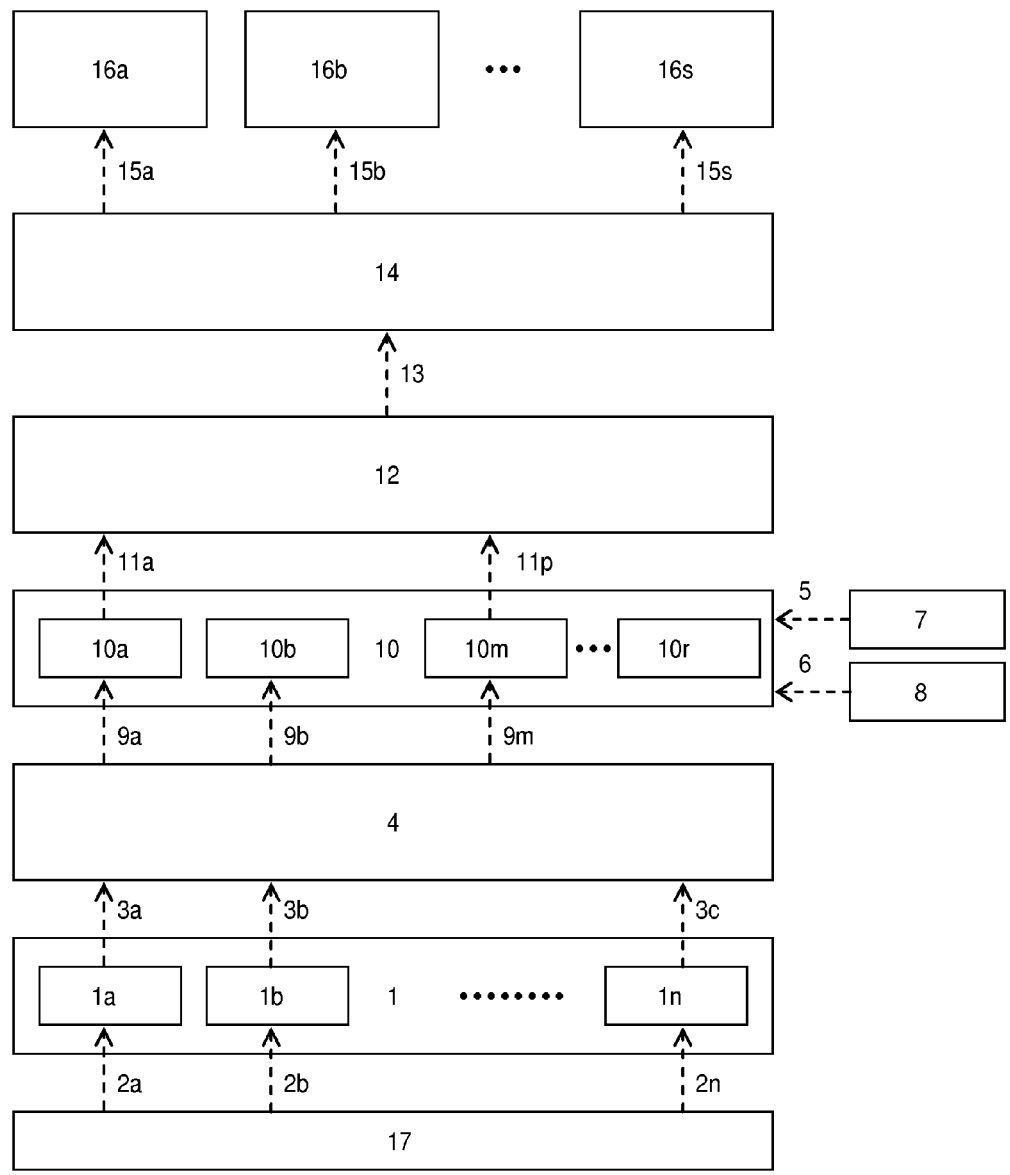
FIG. 1 shows the block diagram of the preferred embodiment of the method of the invention.
Figure 2:
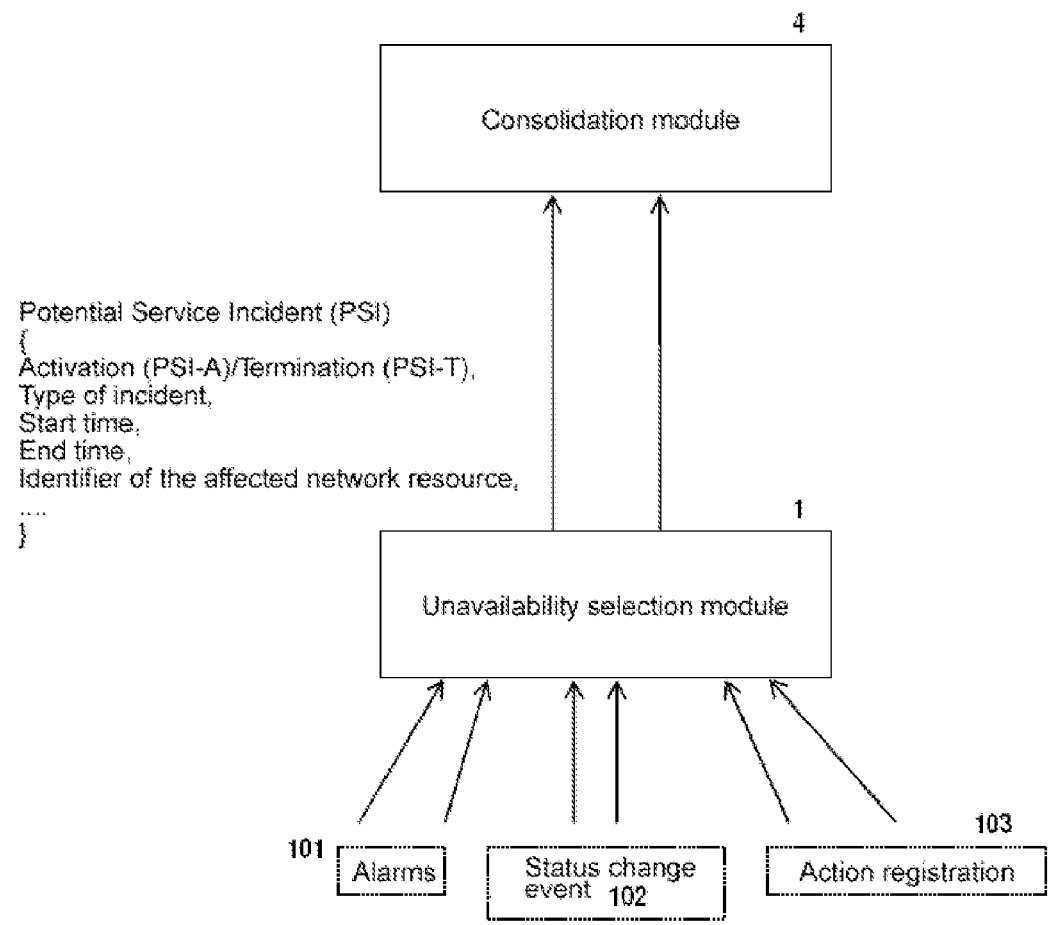
FIG. 2 schematically shows the behavior of the unavailability selection module.

A preferred embodiment of the invention is described below in more detail in an illustrative manner, which embodiment, as shown in FIG. 1, is formed by the following functional blocks:

An unavailability selection module 1 which, as shown in FIG. 2, collects information from the network and from the network element managers 17 and identifies any alarm 101, status change event 102 or action registration 103 showing the complete unavailability of a network resource or the end of said unavailability.

It is formed by n unavailability selection submodules $1a$-$1b$- . . . -$1n$, each of them specialized in collecting and selecting the unavailability information corresponding to a determined network technology $2a$-$2b$- . . . -$2n$. Furthermore, it notifies the consolidation module 4 of each of these situations as potential service incidents, PSI, $3a$-$3b$- . . . -$3n$ in the activation mode thereof, i.e., start of the complete unavailability in the network resource, or in the termination mode thereof, i.e., the and of the complete unavailability in the network resource.

By way of example, for the identification of the impact of the incidents in a mobile telephony network on GSM and UMTS voice and date services, the n unavailability selection submodules $1a$-$1b$- . . . -$1n$ capture and classify situations such as:

Crash of a GSM mobile telephony cell.
Re-establishment of a GSM mobile telephony cell.
Manual blocking of a GSM mobile telephony cell
Manual restoration of a GSM mobile telephony cell.
Crash of a GSM mobile telephony base station controller (BSC).
Re-establishment of a GSM mobile telephony base station controller (BSC)
Crash of a GSM mobile telephony switching center (MSC).
Re-establishment of a GSM mobile telephony switching center (MSC).
Crash of a UMTS third generation mobile telephony cell.
Re-establishment of a UMTS third generation mobile telephony cell.
Manual blocking of a UMTS third generation mobile telephony cell.
Manual restoration of a UMTS third generation mobile telephony cell.
Crash of a mobile telephony home location register (HLR).
Restoration of a mobile telephony home location register (HLR),
Crash of a support node for the GPRS (General Packet Radio System) data service, i.e., of a SGSN (Serving GPRS Support Node) node.
Restoration of a support node for the GPRS data service, i.e., of a SGSN node.
Etc.

All these situations are notified as potential service incidents, PSI.

The unavailability selection module notifies the consolidation module 4 of the corresponding potential service incident (PSI), giving information about its activation (PSI-A) or about its termination (PSI-T), the type of incident in question, the start time and the end time, the identifier of the network resource affected, etc.

Figure 3:
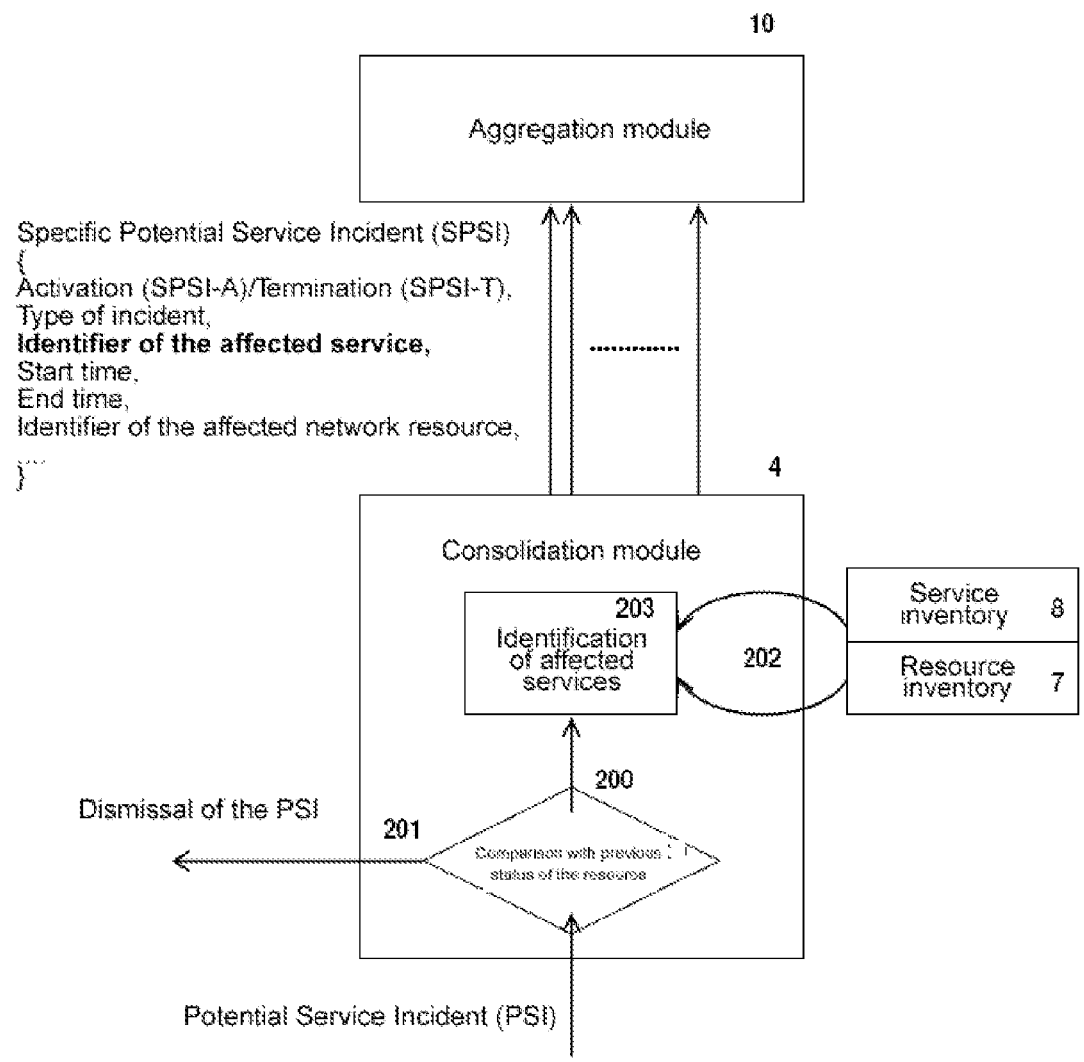
FIG. 3 schematically shows the behavior of the consolidation module.

As shown in FIG. 3, the consolidation module 4 compares the status of the network resource (available or unavailable) referred to by each of the potential service incidents $3a$-$3b$- . . . -$3n$ received from the unavailability selection module 1 with the status previously registered for said resource (decision making 200). This status will be determined by all the previously received PSIs with reference to the resource in question.

If the status of the resource has not changed, the potential service incident is dismissed (step 201).

And if the status of the resource has changed, the resource status is updated and then the network resource configuration information 5 and the service configuration information 6 stored in the network resource inventory 7 and service inventory 8, respectively, is accessed (step 202), the services in which the network resource referred to by the PSI is involved being identified (step 203).

Finally, this consolidation module 4 performs a splitting of each IPS into as many specific potential service incidents, SPSI, $9a$-$9b$- . . . -$9m$ as services in which the resource is involved, sending them to the aggregation module 10 (see FIG. 1). As shown in FIG. 2, in each of these specific potential service incidents, SPSI, the consolidation module has included an identifier of the affected service in each SPSI.

This consolidation part of the method, materialized in the consolidation module, allows filtering a large part of the enormous volume of the status information captured from the network, which reflects small status changes which can be considered irrelevant from the point of view of the service, allowing the discrimination of the relevant changes (in typology and extent) determining each of the stages of evolution of the network incident.

Figure 4:
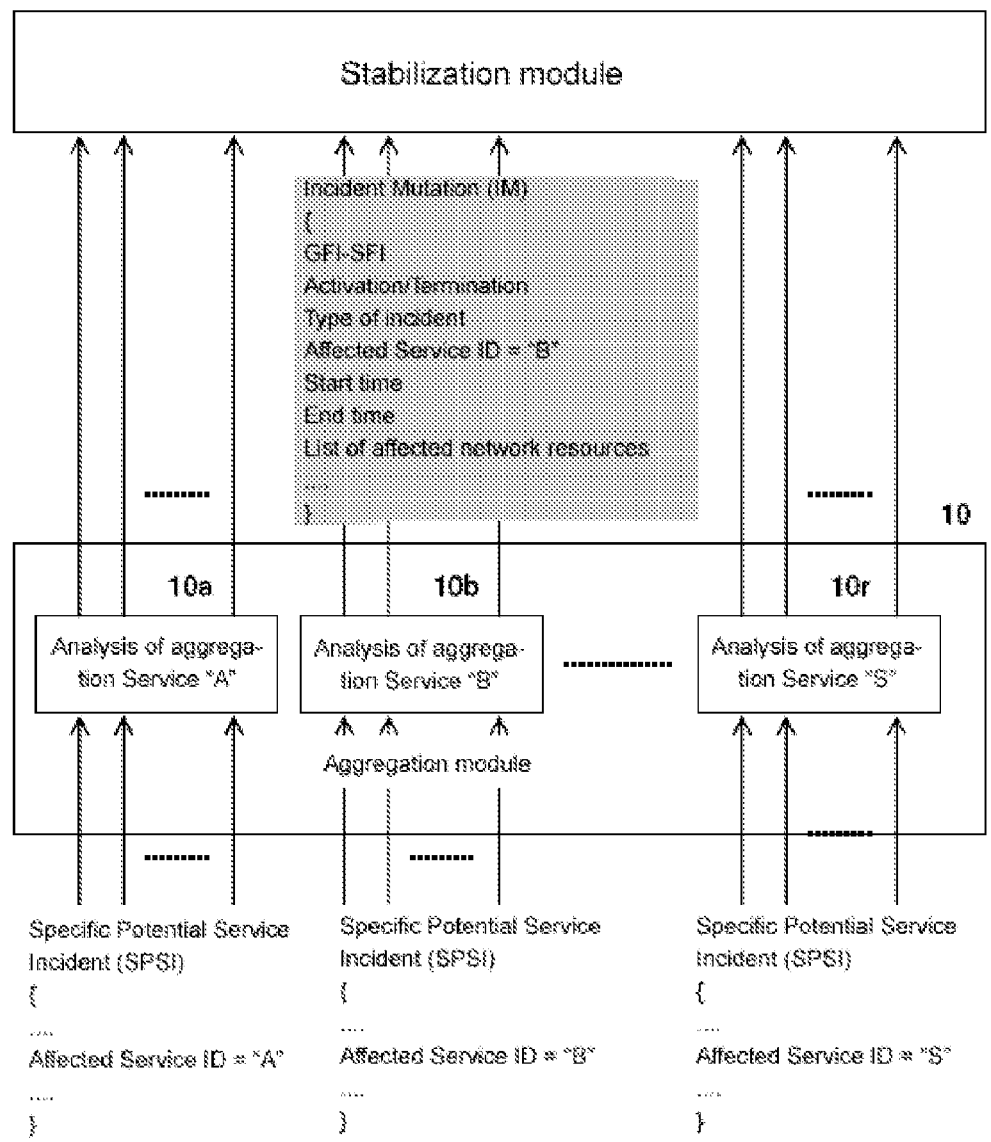
FIG. 4 schematically shows the behavior of the aggregation module.

As shown in FIG. 4, the aggregation module 10 elucidates if the specific potential service incidents SPSI received from the previous stage $9a$-$9b$- . . . -$9m$ actually give rise to a service incident, SI, or an alteration thereof. This analysis is performed individually, service by service. The aggregation module is formed by "r" aggregation submodules, $10a$-$10b$- . . . -$10m$- . . . -$10r$, each of them specialized in the evaluation of impact on a determined service.

Each of these submodules $10a$-$10b$- . . . -$10m$- . . . -$10r$ applies correlation techniques which take into account the network topology and, in its absence (if the available network topology information does not allow it), time/space proximity criteria, to determine which is the net effect of each specific potential service incident 9a-9m, received from the consolidation module 4. Once this effect is determined, and if appropriate, the aggregation submodules associated with each service 10a-10r generate an incident mutation (IM) 11a-11p to the stabilization module 12, identified with the global fault identifier, GFI, and the specific fault identifier, SFI, and which incorporates as basic information: the type of incident, the identifier of the affected service, the list of network resources which are affected at that time and the date and time in which the mutation has occurred (see FIG. 4).

The process for determining the effect of each specific potential service incident SPSI is performed as follows:

If the network resource referenced by the SPSI is related, by functional dependence or by time/space proximity, with network resources encompassed in a single ongoing service incident, then the resource referenced by the SPSI and all those which functionally depend on it are aggregated to the list of resources affected by said service incident.

If the network resource referenced by the SPSI is related, by functional dependence or by time/space proximity, with network resources encompassed in two or more ongoing service incidents, then said incidents are united in a single one and the resource referenced by the SPSI and all those which functionally depend on it are aggregated to the list of resources affected by the resulting service incident which, on the other hand, retains the characteristics of the oldest service incident of all those aggregated.

If the network resource referenced by the SPSI is not related, by functional dependence or by time/space proximity, to any other network resource encompassed in a ongoing service incident, then a new service incident is created which initially has, as the list of affected resources, the resource referenced by the SPSI and all those which functionally depend on it.

The space proximity relationship between network resources is defined according to the typology of the network resources and of the physical location thereof. For example, in the calculation of the impact on mobile telephony services, the criterion of space proximity between cells can be defined according to their location (rural, urban, suburban, etc.) and their type (macrocell, microcell, picocell, etc.).

The time proximity relationship is exclusively defined according to the time elapsed between incidents.

In all the cases, the type of the resulting service incident or incidents is re-evaluated. Both the changes in the ongoing service incidents and the appearance of new service incidents are notified to the following stage as incident mutations 11a-11p.

Figure 5:
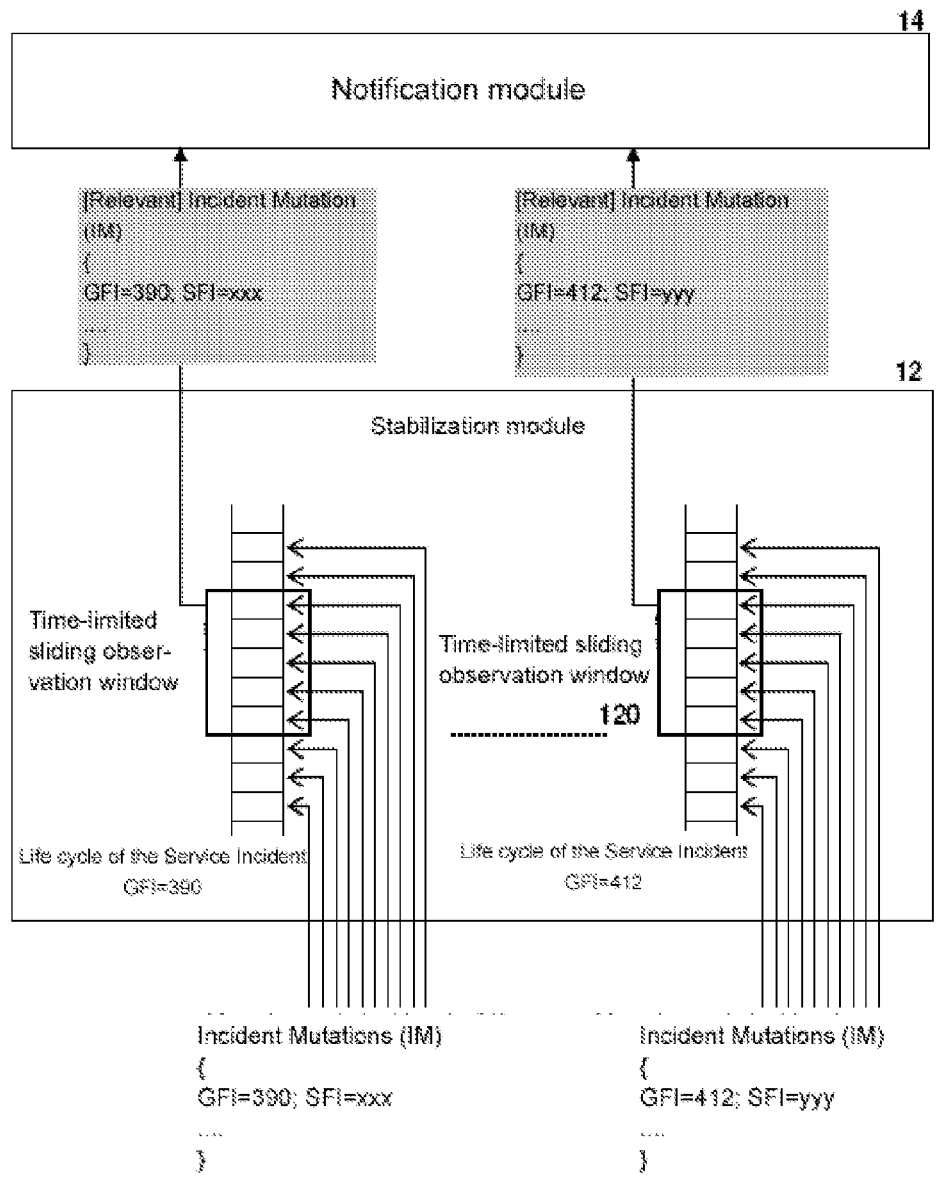
FIG. 5 schematically shows the behavior of the stabilization module.

The stabilization module 12 (the behavior of which is shown in FIG. 5) makes relevant service incident mutations 13 progress to the notification module 14, which mutations can actually provide relevant information about the evolution of the service incident. To that end, the stabilization module uses a time-limited sliding observation window 120, jointly analyzing all the incident mutations occurring in said time window. Of all of them, only the last mutation progresses to the notification module, provided that it represents a change in the extent or in the type of the service incident with respect to the last incident mutation sent.

Finally, the notification module 14 sends notifications 15a-15b- . . . -15s relative to the relevant incident mutations to other client processes 16a-16b- . . . -16s based on the subscriptions established by such clients.

The invention has been described according to preferred embodiments thereof, but for the person skilled in the art it will be evident that multiple variations can be introduced in said preferred embodiments without exceeding the object of the claimed invention.

The invention claimed is:

1. Method for identifying and characterising a network incident on a service offered to a user of a telecommunications network, which comprises: collecting information relative to incidents of said network and of network element managers; identifying in said information an event relative to the complete unavailability of a network resource, either as a start status or end status of said complete unavailability of a network resource; notifying each identified event as a potential service incident PSI together with said start status or end status of the resource; comparing the status of the network resource of each potential service incident PSI with the status previously registered for said resource, which is determined by the previous potential service incidents with reference to that network resource in question, and updating this status if this status has changed; if this status has changed, accessing network resource configuration information and service configuration information stored in a network resource inventory and in a service inventory, respectively, and performing a splitting of each potential service incident PSI into as many specific potential service incidents SPSI as services in which said network resource is involved; determining, individually for each service, if each specific potential service incident SPSI gives rise to a service incident SI or an incident mutation IM, applying correlation techniques which take into account the network topology and, in the absence of the network topology, criteria of time-space proximity; identifying each of those incident mutations IM by means of a global fault identifier GFI identifying the service incident to which the incident belongs and a specific fault identifier SFI identifying the stage of evolution of the incident, said incident mutation including information about the type of incident, an identifier of the affected service, a list of affected network resources and the date and time in which the mutation has occurred; making those incident mutations modifying the list of resources affected by the incident progress, determining the set of users affected by said incident; and notifying the incident mutations to client processes based on subscriptions established by such clients.

2. Method according to claim 1, wherein the step of determining if each specific potential service incident SPSI gives rise to a service incident SI or to an incident mutation IM is performed as follows: if the network resource referenced by the SPSI is related, by functional dependence or by time/space proximity, to network resources encompassed in a single ongoing service incident, then the resource referenced by the SPSI and all those which functionally depend on the resource referenced by the SPSI are aggregated to the list of resources affected by said service incident; if the network resource referenced by the SPSI is related, by functional dependence or by time/space proximity, with network resources encompassed in two or more ongoing service incidents, then said incidents are united in a single one and the resource referenced by the SPSI and all those which functionally depend on the resource referenced by the SPSI are aggregated to the list of resources affected by the resulting service incident, which retains the characteristics of the oldest service incident of all those aggregated; if the network resource referenced by the SPSI is not related, by functional dependence or by time/space proximity, to any other network resource encompassed in an ongoing service incident, then a new service incident is created which initially has, as the list of affected resources, the resource referenced by the SPSI and all those which functionally depend on the resource referenced by the SPSI.

3. Method according to claim 1, wherein the space proximity relationship between network resources is defined according to the typology of the network resources and the physical location thereof.

4. Method according to claim 1, wherein the time proximity relationship is defined according to the time elapsed between incidents.

5. Method according to claim 1, wherein a change in the service incident is notified as incident mutations.

6. System for identifying and characterizing an incident in a service offered to a user of a telecommunications network, comprising an unavailability selection module, a consolidation module, an aggregation module, a stabilization module and a notification module, wherein: the unavailability selection module is configured to: collect from said network and from network element managers information relative to an incident of said network, identify an event relative to the complete unavailability of a network resource, either as a start status or end status of said complete unavailability of a network resource, and notify each identified event to the consolidation module as a potential incident in a service together with said start status or end status of the resource; the consolidation module is configured to: compare the status of the network resource of each potential service incident PSI with the status previously registered for said resource, which is determined by the previous potential service incidents with reference to that network resource in question, and update this status if this status has changed; if this status has changed, access network resource configuration information and service configuration information stored in a network resource inventory and in a service inventory, respectively, and perform a splitting of each potential service incident into as many specific potential service incidents as services in which said network resource is involved, and send said specific potential service incidents to the aggregation module; the aggregation module is configured to: determine, individually for each service, if each specific potential service incident gives rise to a service incident SI or an incident mutation IM, applying correlation techniques which take into account the network topology and, in the absence of the network topology, criteria of time-space proximity; identify each of said incident mutations by means of a global fault identifier GFI identifying the service incident to which the incident belongs and a specific fault identifier SFI identifying the stage of evolution of the incident, and send the incident mutation to the stabilization module, said incident mutation IM including information relative to the type of the incident, an identifier of the affected service, a list of affected network resources and the date and time in which the mutation has occurred; the stabilization module is configured to make incident mutations modifying the list of resources affected by the incident progress to the notification module, determining the set of users affected by said incident; and the notification module is configured to notify the incident mutations to client processes based on the subscriptions established by such clients.

* * * * *